(12) United States Patent
Droscher et al.

(10) Patent No.: US 10,955,054 B2
(45) Date of Patent: Mar. 23, 2021

(54) MECHANICAL SEAL ARRANGEMENT AND WELL BORE CONVEYOR DEVICE

(71) Applicant: EagleBurgmann Germany GmbH & Co. KG, Wolfratshausen (DE)

(72) Inventors: Peter Droscher, Geretsreid (DE); Andreas Pehl, Poing (DE); Dieter Pfeil, Konigsdorf (DE); Berthold Schulten, Geretsried (DE); Glenn Schmidt, Cambridge, MA (US); Eric Vanhie, Houston, TX (US)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 58 days.

(21) Appl. No.: 16/307,038

(22) PCT Filed: Apr. 18, 2017

(86) PCT No.: PCT/EP2017/059136
§ 371 (c)(1),
(2) Date: Dec. 4, 2018

(87) PCT Pub. No.: WO2017/211491
PCT Pub. Date: Dec. 14, 2017

(65) Prior Publication Data
US 2019/0219169 A1    Jul. 18, 2019

(30) Foreign Application Priority Data

Jun. 9, 2016    (DE) .................... 10 2016 210 173.0

(51) Int. Cl.
*E21B 43/12*    (2006.01)
*F16J 15/00*    (2006.01)
(Continued)

(52) U.S. Cl.
CPC .......... *F16J 15/006* (2013.01); *E21B 43/128* (2013.01); *F16J 15/3448* (2013.01); *F16J 15/40* (2013.01)

(58) Field of Classification Search
CPC ........ E21B 43/128; E21B 33/02; E21B 33/08; E21B 33/085; E21B 33/10; E21B 10/25;
(Continued)

(56) References Cited

U.S. PATENT DOCUMENTS

| 2008/0078560 | A1* | 4/2008 | Hall ........................ E21B 4/003 166/387 |
| 2011/0194949 | A1* | 8/2011 | Parmeter ............... E21B 43/128 417/53 |
| 2015/0323079 | A1* | 11/2015 | Semple .................... F16J 15/40 277/348 |

FOREIGN PATENT DOCUMENTS

| DE | 102013003445 A1 | 9/2014 |
| WO | 2015/172087 A1 | 11/2015 |

OTHER PUBLICATIONS

American Heritage Dictionary: Annular (https://www.andictionary.com/word/search.html?q=annular) Accessed 2020 (Year: 2020).*

(Continued)

*Primary Examiner* — David Carroll
(74) *Attorney, Agent, or Firm* — Locke Lord LLP; Scott D. Wofsy

(57) ABSTRACT

A mechanical seal arrangement includes a first mechanical seal with a rotating slide ring and a stationary slide ring, which define a sealing gap in between them. The mechanical seal arrangement includes a first sealing space that is filled with a sealing liquid. The first mechanical seal seals off the sealing space against a surrounding area, a first piston arrangement with a piston element and flexible wall areas that define a first piston interior space, wherein the first piston interior space is in fluid connection with the first
(Continued)

Figure 1:
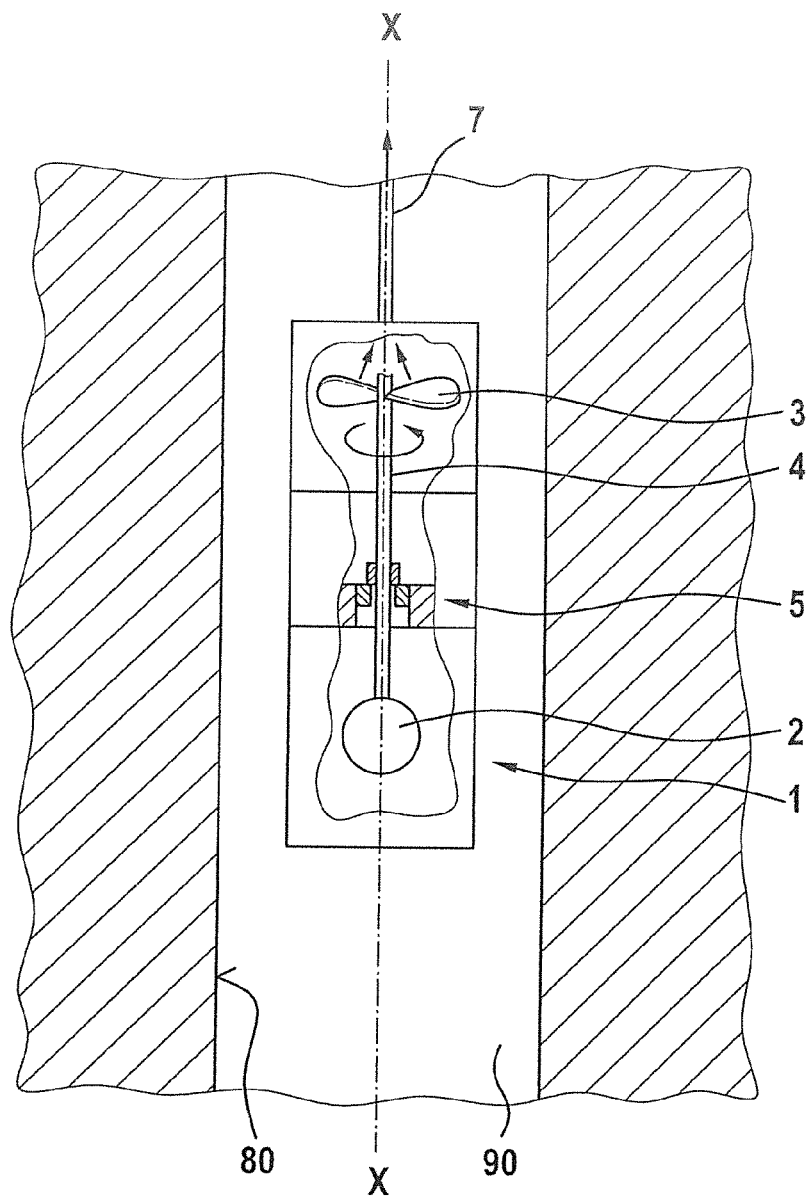

sealing space. A piston outer surface of the piston element is in fluid connection with the surrounding area, and a first pre-stressing appliance that exerts a first preload force (F1) on the piston element of the first piston arrangement.

8 Claims, 5 Drawing Sheets

(51) Int. Cl.
*F16J 15/34* (2006.01)
*F16J 15/40* (2006.01)

(58) Field of Classification Search
CPC ...... E21B 4/003; F16J 15/006; F16J 15/3448; F16J 15/40
See application file for complete search history.

(56) References Cited

OTHER PUBLICATIONS

Schlumberger Oilfield Glossary: Annulus (https://www.glossary.oilfield.slb.com/Terms/a/annulus.aspx) Accessed 2020 (Year: 2020).*
International Search Report issued in PCT/EP2017/059136, dated Jul. 3, 2017.

\* cited by examiner

MECHANICAL SEAL ARRANGEMENT AND WELL BORE CONVEYOR DEVICE

CROSS REFERENCE TO RELATED APPLICATIONS

This application is a § 371 U.S. National Phase Application of International PCT Patent Application No. PCT/EP2017/059136, filed Apr. 18, 2017, which claims priority to German Patent Application No. 10 2016 210 173.0, filed Jun. 9, 2016. The entire contents of these applications are incorporated herein by reference in their entirety.

The invention relates to a mechanical seal arrangement which is in particular capable of being operated at hard-to-access locations over a very long period of time, in particular multiple years, as well as a well bore conveyor device for conveying in well bores with a mechanical seal arrangement according to the invention.

Well bore conveyor devices are known from the state of the art in different embodiments. For example, such conveyor devices are used in well bores for conveying oil or the like. At that, the well bore conveyor devices are lowered into the well bore until they are close to a base of a well bore, pumping the medium to be conveyed to the surface via a conduit that is guided through the well bore. A pump that is used for this purpose is usually driven by means of an electrical drive. Here, the problem of sealing a shaft connecting the electrical drive to the pump arises. Since the well bore conveyor device is usually used for a very long time, sealing must be ensured over a very long period, in particular for multiple years, as failure of the seal entails a very high effort for its replacement and in particular also an interruption of production.

What is further known from DE 102013003445 A1 is a well bore conveyor device in which a mechanical seal is used for sealing between an electrical drive and a pump. Here, an autarkic supply appliance is provided at the mechanical seal to ensure an operation over several years. In principle, this well bore conveyor device has proven to work well. However, when strong temperature and pressure fluctuations occur in the well bore the desired long-time service lives of up to five years cannot be achieved, as the barrier medium for sealing and/or lubricating a sealing gap of the mechanical seal as it is conveyed by the autarkic supply appliance to the mechanical seal can have an excessively high leakage due to the high temperature and pressure differences.

An alternative solution is known from US 2011/0194949 A1 in which a mechanical seal is used for sealing. At that, a rotating slide ring is pressed against the seating ring by means of a spring element and a bellows. Further, a sleeve is provided that can be readjusted in the axial direction of the shaft so that a contact pressure between the sealing partners is always achieved. However, due to this re-adjustability, this mechanical seal is subject to a high degree of wear and tear, so that the desired service life of many years cannot be obtained.

A further problem area occurring with well bore conveyor devices entails the high temperatures that are present at the base of the well bore. The high temperatures lead to a heating of a barrier medium for the mechanical seal, whereby in particular also a pressure rise occurs, so that a leakage of the barrier medium over the sealing gap of the mechanical seal is increased, which can lead to the service life of the mechanical seal being shortened.

Thus, it is the objective of the present invention to provide a mechanical seal arrangement which, while having a simple structure and a simple, cost-effective manufacturability, facilitates a reliable sealing of a shaft, in particular in a well bore, wherein functioning of the mechanical seal arrangement is ensured over several years. Further, it is the objective of the present invention to provide a well bore conveyor device that facilitates an operation in a well bore over several years.

The objective is achieved through a mechanical seal arrangement with the features of claim 1 and a well bore conveyor device with the features of claim 7. The subclaims show respectively preferred further developments of the invention.

The mechanical seal arrangement according to the invention with the features of claim 1 has the advantage that a reliable sealing is facilitated over a long period of time, and in particular that is can also compensate for temperature changes and pressure changes. Here, it is in particular possible to compensate for temperature increases, which lead to pressure increases in a sealing liquid (barrier medium). Here, the mechanical seal arrangement comprises a first mechanical seal with a rotating and a stationary slide ring, which define a sealing gap in between them. The sealing liquid is arranged in a first sealing space, wherein the first mechanical seal seals the first sealing space against a surrounding area. Further, a first piston arrangement is provided, having a piston element and flexible wall areas that are connected to the piston element, wherein the flexible wall areas and the piston element define a first piston interior space. The first piston interior space is in fluid connection with the first sealing space, so that a sealing liquid is also present in the first piston interior space. A piston outer surface of the first piston element is in fluid connection with the surrounding area. Thus, the ambient pressure is applied at the piston outer surface. Further, a first pre-stressing appliance is provided that exerts a preload force on the first piston element. At that, the preload force is oriented in the direction towards the first piston interior space. In that manner, it is ensured that a pressure level in the first sealing space is always higher than a pressure level in the surrounding area. Here, the flexible wall areas of the first piston arrangement facilitate an expansion of the sealing liquid in the first sealing space when the temperature rises. Thus, according to the invention, it can be avoided that, in the event of a rising temperature and an accompanying increase in volume as well as a rise of a pressure of the sealing liquid, an excessively large leakage occurs over the sealing gap of the mechanical seal, which would significantly reduce the operating life of the mechanical seal arrangement.

For this reason, the mechanical seal arrangement according to the invention is in particular suitable for being used for sealing tasks that require a long functional life, such as for example for a sealing between a drive and a pump in a well bore.

It is particularly preferable when the first piston interior space is an annular space, and the first piston element is an annular piston. In this manner, the first piston arrangement can be arranged about a shaft, with the result being a particularly compact structure of the mechanical seal arrangement.

Further, it is preferable if the flexible wall areas of the first piston arrangement are provided by means of a first bellows and a second bellows. Here, the first bellows and the second bellows preferably have a substantially cylindrical shape, with the diameters being different. In this manner, the piston interior space is provided between the first bellows and the second bellows. The two bellows are preferably made of metal.

It is particularly preferable if the first pre-stressing appliance comprises a plurality of spring elements. The plurality of spring elements is preferably arranged equidistantly with respect to each other in the circumferential direction. Particularly preferably, the spring elements are coil springs.

Preferably, a second mechanical seal is provided to achieve a redundancy of the sealing of a drive with the mechanical seal arrangement according to the invention. The second mechanical seal is constructed in the same way as the first mechanical seal and arranged in series with the first mechanical seal. The second mechanical seal comprises a rotating and a stationary slide ring, which define a sealing gap in between them, as well a second sealing space that is filled with sealing liquid. Particularly preferably, the sealing liquid is the same sealing liquid as that of the first mechanical seal. Further, the second mechanical seal comprises a second piston arrangement with a second piston element and flexible wall areas, which define a second piston interior space. Here, the second mechanical seal seals off the second sealing space from the first sealing space. Here, the second piston interior space of the second piston arrangement is in fluid connection with the second sealing space. Further, a second pre-stressing appliance is provided, exerting a preload force on the second piston element of the second piston arrangement. Thus, a redundant sealing can be achieved.

Further, the mechanical seal arrangement preferably comprises a third mechanical seal that is constructed corresponding to the first and second slide ring sea. Here, the third mechanical seal seals between a third sealing space and the second sealing space. The third mechanical seal is arranged in series behind the second mechanical seal. The third mechanical seal comprises a third sealing space that is filled with sealing liquid and a third piston arrangement with a third piston element and flexible wall areas that define a third piston interior space. The third piston interior space is in fluid connection with the third sealing space and a piston outer surface of the piston element of the third piston arrangement is in fluid connection with the second sealing space. Further, a third pre-stressing appliance is provided, exerting a preload force on the third piston element of the third piston arrangement.

For a further redundancy, preferably a fourth mechanical seal is provided, which is arranged in series behind the third mechanical seal and has the same structure as the third mechanical seal. Here, the fourth mechanical seal seals between a fourth sealing space and the third sealing space. The fourth mechanical seal comprises a fourth piston arrangement with a fourth piston element and flexible wall areas that define a fourth piston interior space, wherein the piston interior space of the fourth piston arrangement is in fluid connection with the fourth sealing space. A piston outer surface of the fourth piston element of the fourth piston arrangement is in fluid connection with the third sealing space. Further, a fourth pre-stressing appliance is provided, exerting a preload force on the piston element of the fourth piston arrangement.

As becomes clear from the above description, the mechanical seal arrangement can comprise multiple mechanical seals, for example between one and four mechanical seals, which seal in series behind each other, starting at the medium to be sealed off, e.g. a dielectric medium of an electrical drive, and up to a surrounding area. Through the arrangement according to the invention, there are always slightly higher pressures in the sealing areas that are facing away further from the surrounding area. That is, a pressure in the first sealing space is lower than a pressure in the second sealing space, and a pressure in the second sealing space is lower than a pressure in the third sealing space, and a pressure in the third sealing space is lower than a pressure in the fourth sealing space.

Through the higher pressure of the sealing liquid with respect to the surrounding area, it is in particular also possible to avoid a contamination of the sealing liquid by a product to be conveyed that is present in the surrounding area.

If the mechanical seal arrangement according to the invention comprises more than one mechanical seal, the sealing liquids in the plurality of mechanical seals are preferably identical. Here, it is particularly preferable if an oil is used as the sealing liquid. Particularly preferably, the oil has a density corresponding to a product to be conveyed, which preferably is crude oil. In that case, a particularly good and reliable compensation of temperature increases of the sealing liquids can be ensured.

It is further preferable if the mechanical seal arrangement comprises a housing sleeve inside of which the structural components of the mechanical seal arrangement are arranged. The housing sleeve preferably has an opening with a diameter that is as small as possible in order to establish a connection between the surrounding area and the outer side of the housing sleeve. In this way, the surrounding area at the mechanical seal has the ambient pressure.

Further, the present invention relates to a well bore conveyor device, in particular for conveying oleiferous media or crude oil. The conveyor device comprises an electrical drive and a pump that is connected to the electrical drive via a drive shaft. At the drive shaft, a mechanical seal arrangement according to the invention provides the sealing.

It is particularly preferable if a housing sleeve is arranged between the electrical drive and the pump, with the mechanical seal arrangement being arranged therein. The housing sleeve has at least one opening to connect a surrounding area of the mechanical seal arrangement with the outer side of the housing sleeve.

Figure 2:
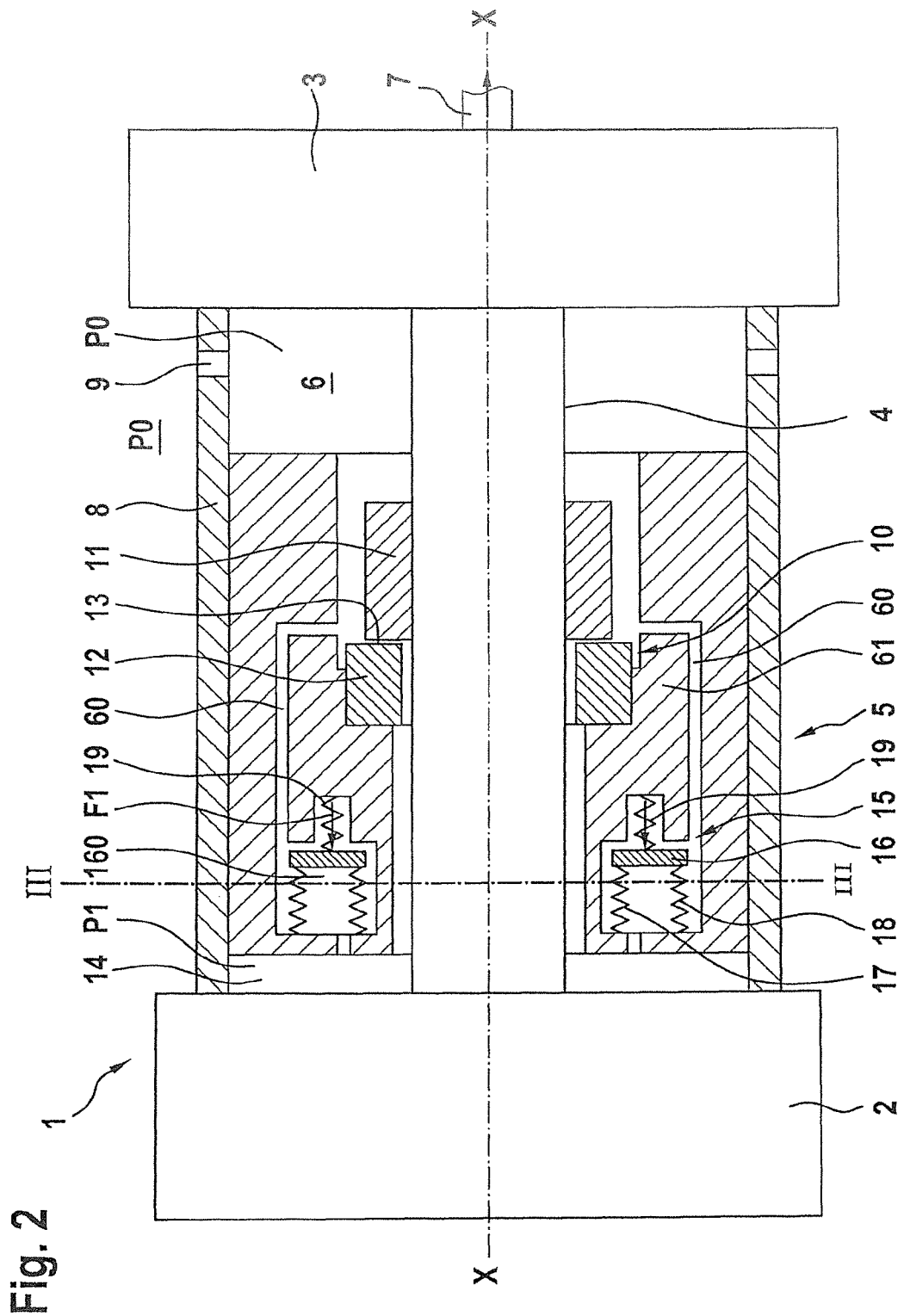
Figure 3:
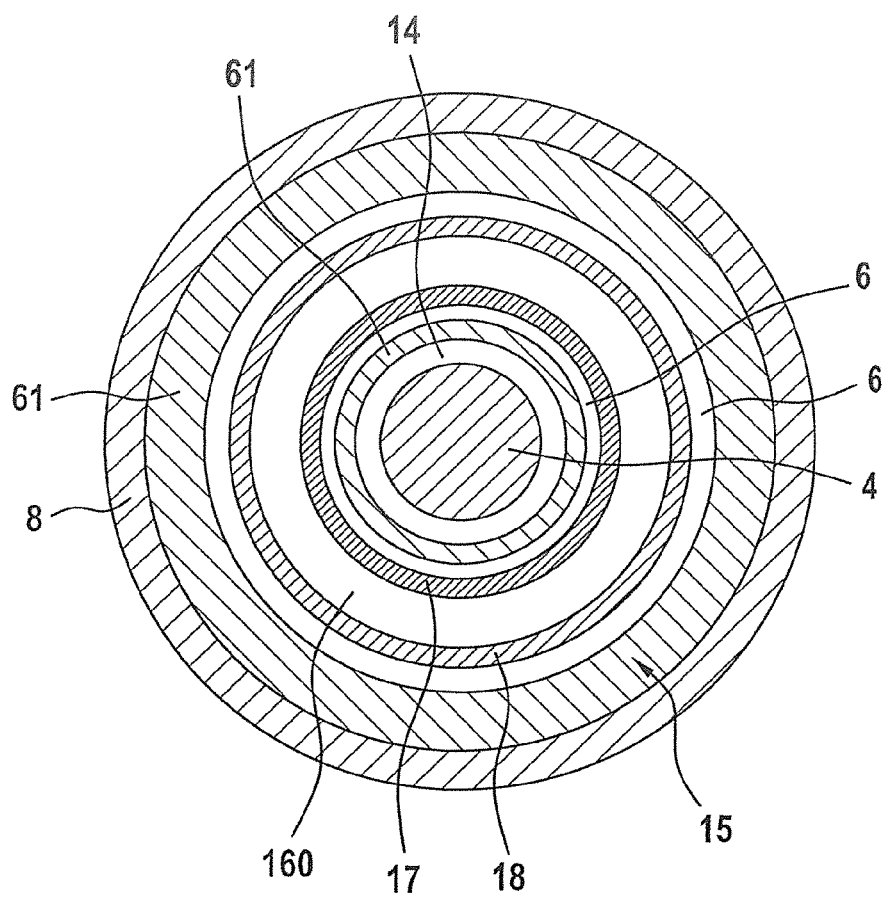
Figure 4:
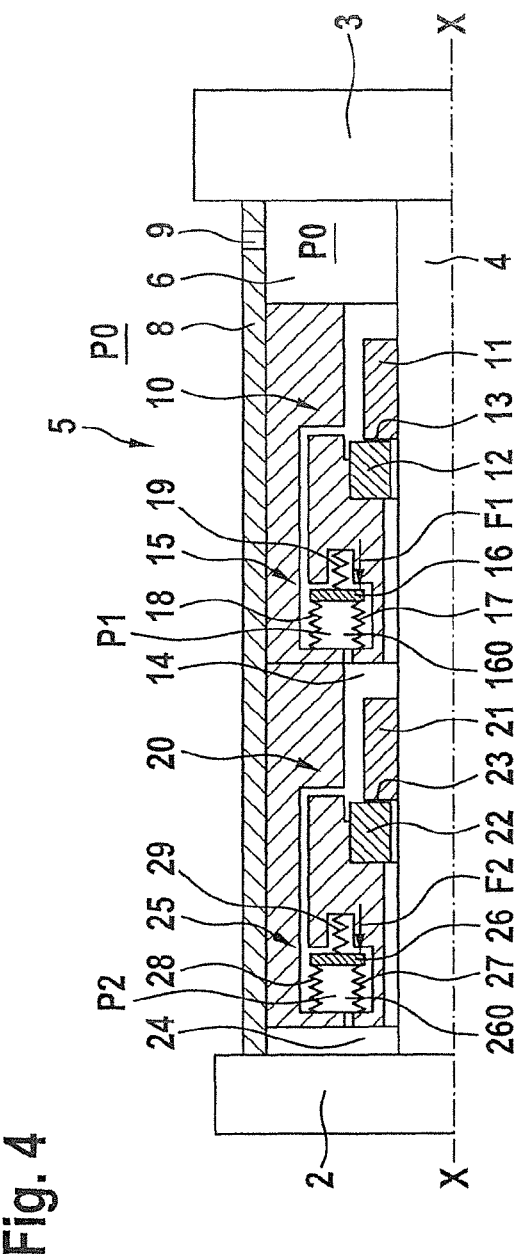
Figure 5:
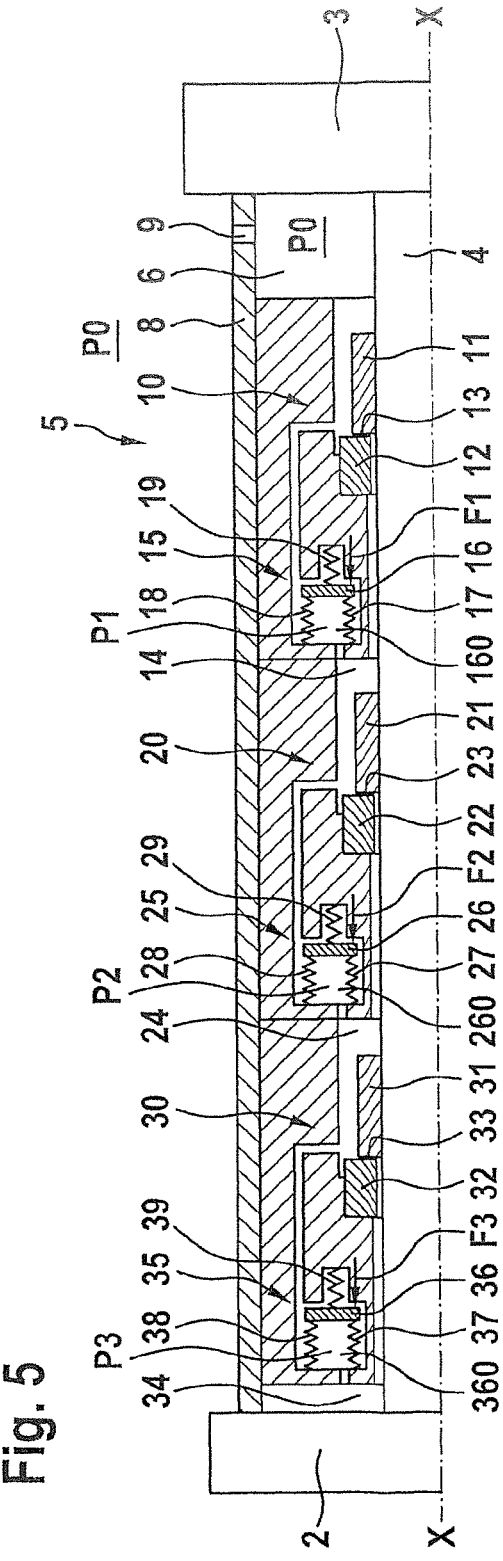
Figure 6:
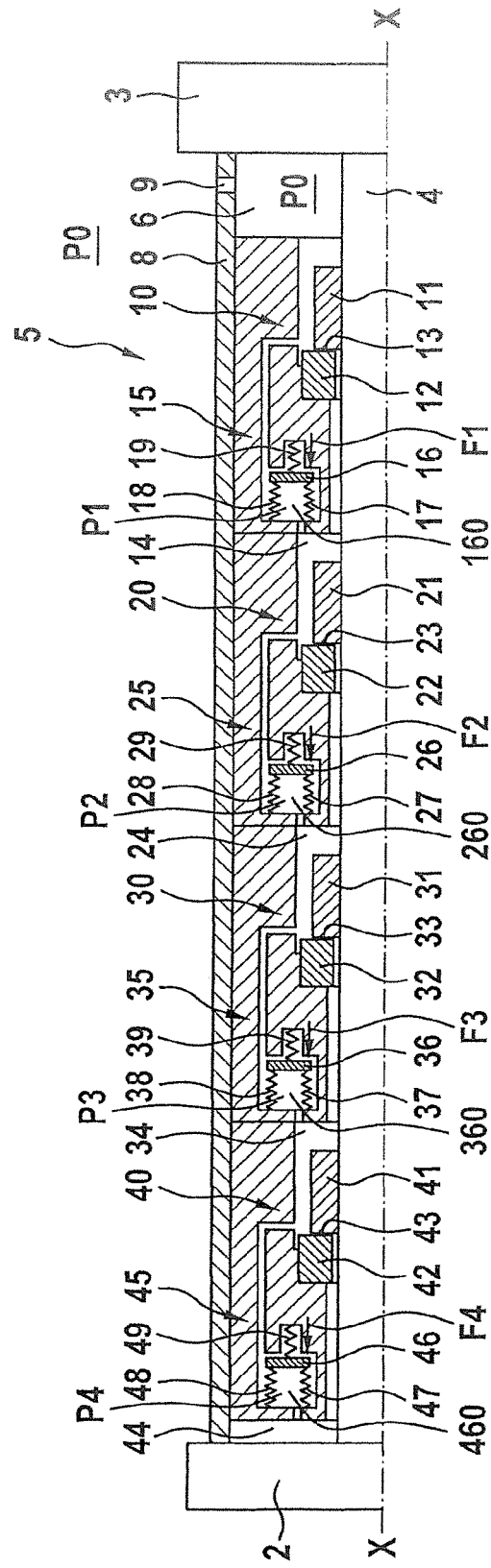

In the following, preferred exemplary embodiments of the invention are described in detail by referring to the accompanying drawing. In the drawing:

FIG. 1 shows a schematic rendering of a well bore conveyor device according to a first exemplary embodiment of the invention, FIG. 2 shows a schematic rendering of the mechanical seal arrangement of the well bore conveyor device of FIG. 1, FIG. 3 shows a schematic sectional view along the line III-III of FIG. 2, FIG. 4 shows a schematic sectional view of a mechanical seal arrangement according to a second exemplary embodiment of the invention, FIG. 5 shows a schematic sectional view of a mechanical seal arrangement according to a third exemplary embodiment of the invention, and FIG. 6 shows a schematic sectional view of a mechanical seal arrangement according to a fourth exemplary embodiment of the invention.

In the following, a well bore conveyor device 1 according to a first exemplary embodiment of the invention is described in the detail by referring to FIGS. 1 to 3.

FIG. 1 schematically shows an overview of the well bore conveyor device 1. The well bore conveyor device 1 is arranged inside a well bore 80 for conveying a medium 90, in particular crude oil, which is present inside the well bore.

The well bore conveyor device 1 comprises an electrical drive 2 and a pump 3, wherein a mechanical seal arrangement 5 is provided in the electrical drive for sealing a fluid.

As can be seen from FIG. 1, the mechanical seal arrangement 5 is arranged at a drive shaft 4 that leads from the electrical drive 2 to the pump 3.

Here, the pump 3 conveys into a conveying conduit 7.

The mechanical seal arrangement 5 comprises a first mechanical seal 10 with a rotating slide ring 11 and a stationary slide ring 12, which define a sealing gap 13 in between them.

Further, the first mechanical seal 10 comprises a first sealing space 14 as well as a first piston arrangement 15.

The first piston arrangement 15 comprises a first piston element 16, a first bellows 17 and a second bellows 18. The piston element 16, the first bellows 17 and the second bellows 18 define a first piston interior space 160. The first piston interior space 160 is in fluid connection with a first sealing space 14 inside of which the sealing liquid (barrier medium) for the mechanical seal is received.

Further, the first mechanical seal 10 comprises a pre-stressing appliance 19 which in this exemplary embodiment is represented by a plurality of spring elements. The spring elements respectively exert a preload force F1 in the direction towards the first piston element 16.

The first piston element 16 is ring-shaped and, together with the first and second bellows 17, 18, defines a ring-shaped piston interior space 160. Here, the two bellows 17, 18 are formed as metal bellows having different diameters.

Further, the mechanical seal arrangement 5 comprises a surrounding area 6. Here, the first mechanical seal 10 seals off the surrounding area 6 from the first sealing space 14. Via an opening 9, the surrounding area 6 is connected to the outer side of a housing sleeve 8 at which the medium to be conveyed 90 is applied. Due to that, there is the same pressure P0 in the surrounding area 6 as at the outer side of the well bore conveyor device 1.

Here, the opening 9 is chosen to be as small as possible so that the solid particles that are let in and that can lead to the contamination of the surrounding area 6 are as small as possible.

As can be seen from FIG. 2, the surrounding area 6 is connected to an area at the outer side of the second bellows 18 via channels 60 in a slide ring support component 61. Thus, a piston outer surface of the first piston element 16 of the first piston arrangement 15 is connected to the surrounding area 6.

Thus, the same pressure P0 is present in the surrounding area 6 and in the well bore 80. In the first sealing space 14, a pressure P1 is present, which is higher than the pressure P0.

This is achieved because a pre-stressing appliance 19 exerts a preload force F1 on the ring-shaped piston element 16.

As can further be seen from FIG. 2, the first piston arrangement 15 is arranged closer to the drive 2 in the axial direction X-X of the mechanical seal arrangement 1 than the first mechanical seal 10. Here, the sealing liquid in the first sealing space 14 is preferably a dielectric medium of an electric motor of the drive 2.

FIG. 3 shows a cross section of the first piston arrangement 15. As becomes clear from FIG. 3, the first piston arrangement 15 is completely enclosed by the surrounding area 6.

If now a temperature rises, for example at the base of the well bore at which the well bore conveyor device 1 is arranged, the temperature of the sealing liquid in the first sealing space 14 rises as well. As a consequence, an expansion of the sealing liquid occurs, which can be compensated for by the flexibility of the two bellows 17, 18. However, here the pre-stressing appliance 19 exerts a preload force F1 on the piston element 16, so that a new balance occurs. But by providing the pre-stressing appliance 19 it is ensured that a pressure in the first sealing space 14 is always higher than that in the surrounding area 6. In this manner, it is avoided that a medium can get into the sealing gap 13 between the rotating slide ring 11 and the stationary slide ring 12 from the surrounding area 6.

FIG. 4 shows a mechanical seal arrangement of a well bore conveyor device according to a second exemplary embodiment of the invention. In contrast to the first exemplary embodiment, in the second exemplary embodiment a second mechanical seal 20 is provided.

Here, the first mechanical seal 10 and the second mechanical seal 20 are arranged in series between the drive 2 and the pump 3. Here, the housing sleeve 8 surrounds both mechanical seals 10, 20.

Here, the structure of the second mechanical seal 20 corresponds to the structure of the first mechanical seal 10. More specifically, the second mechanical seal 20 comprises a rotating slide ring 21 and a stationary slide ring 22, which define a sealing gap 23 in between them. Here, the second mechanical seal 20 seals off a second sealing space 24 from the first sealing space 14. The second mechanical seal 20 further comprises a second piston arrangement 25. The second piston arrangement 25 comprises a second piston element 26, a first bellows 27 and a second bellows 28. A piston interior space of the second piston arrangement 25 is indicated by the reference sign 260. Here, the piston interior space 260 is in fluid connection with the second sealing space 24. Further second pre-stressing appliances 29 are provided, exerting a second preload force F2 onto the second piston element 26 of the second piston arrangement 25. In that manner, it is ensured that a second pressure P2 inside the second sealing space 25 is higher than the first pressure P1 inside the first sealing space 14. The first pressure P1 inside the first sealing space 14 is in turn higher than the pressure P0 inside the surrounding area 6. In this manner, it is ensured that, by providing the piston arrangements 15, 25 and the pre-stressing appliances 19, 29, always a slightly higher pressure level is present as compared to the areas that are separated from each other by the mechanical seals 10, 20. The pressure thus increases in the axial direction X-X, starting at pressure P0, in the surrounding area 6 in the direction towards the drive 2. In this manner, it is ensured that the sealing liquid in the second sealing space 24, which seals directly at the drive 2, is not contaminated. Even if the first mechanical seal 10 fails, there is a redundant second mechanical seal.

FIG. 5 shows a mechanical seal arrangement 1 according to a third exemplary embodiment of the invention. As can be seen in FIG. 5, a third mechanical seal 30 is provided to allow for additional sealing redundancy. Here, the first mechanical seal 10, the second mechanical seal 20 and the third mechanical seal 30 are arranged in series, starting from the pump 3 towards the drive 2. The third mechanical seal 30 comprises a rotating slide ring 31 and a stationary slide ring 32, which define a sealing gap 33 in between them. A third sealing space 34 is filled with a sealing liquid which seals at the drive 2. The third mechanical seal 30 comprises a third piston arrangement 35 with a third piston element 36, a first bellows 37 and a second bellows 38, which define a third piston interior space 360 in between them. The third piston interior space 360 is in fluid connection with the third sealing space 34. A third pre-stressing appliance 39 is provided to exert a preload force F3 on the third piston arrangement 35.

Thus, the three mechanical seals 10, 20, 30 principally have the same structure and are switched in series behind each other. Here, a third pressure P3 inside the third sealing space 34 is higher than a second pressure P2 inside the second sealing space 24. Here, the second pressure P2 inside the second sealing space 24 is in turn higher than the first pressure P1 inside the first pressure space 14. The first pressure P1 is in turn higher than the pressure P0 in the surrounding area 6. Thus, a third mechanical seal 30 for further sealing and redundancy is provided in case that the first or second mechanical seal fail.

FIG. 6 shows a mechanical seal arrangement 1 according to a fourth exemplary embodiment of the invention. In the fourth exemplary embodiment, additionally also a fourth mechanical seal 40 is arranged. The fourth mechanical seal 40 has a same structure as the three other mechanical seals 10, 20 and 30. More precisely, the fourth mechanical seal 40 comprises a rotating slide ring 41 and a stationary slide ring 42, which define a sealing gap 43 in between them. A fourth sealing space is provided with the reference sign 44. Further, a fourth piston arrangement 45 with a ring-shaped fourth piston element 46, a first bellows 47 and a second bellows 48 is provided. The fourth piston element 46 and the two bellows 47, 48 define a fourth piston interior space 460 of the fourth piston arrangement 45. A fourth pre-stressing appliance 49 exerts a fourth preload force F4 in the axial direction X-X on the fourth piston arrangement 45. Thus, the fourth mechanical seal 40 seals between the fourth sealing space 44 and the third sealing space 34. Here, the arrangement of the three further mechanical seals 10, 20 and 30 corresponds to the arrangement described in the third exemplary embodiment. Thus, in this exemplary embodiment, in total four mechanical seals 10, 20, 30, 40 are arranged in series between the drive 2 and the pump 3, so that, even if individual mechanical seals fail, a years-long operation inside a well bore or the like is ensured with a high degree of reliability.

Thus, mechanical seal arrangement 5 according to the invention is very well suited for being used in a well bore conveyor device. In this manner, a reliable and damage-free operation of the well bore conveyor device can be facilitated. In particular if multiple mechanical seals are connected in series, it can be redundantly ensured that a medium to be conveyed 90 is prevented from getting into an engine space of the electrical drive 2. In this way, a service life of the electrical drive 2 of several years can be easily ensured.

PARTS LIST

1 well bore conveyor device
2 electrical drive
3 pump
4 drive shaft
5 mechanical seal arrangement
6 surrounding area
7 conveying conduit
8 housing sleeve
9 opening
10 first mechanical seal
11 rotating slide ring
12 stationary slide ring
13 sealing gap
14 first sealing space
15 first piston arrangement
16 first piston element
17 first bellows
18 second bellows
19 first pre-stressing appliance
20 second mechanical seal
21 rotating slide ring
22 stationary slide ring
23 sealing gap
24 second sealing space
25 second piston arrangement
26 second piston element
27 first bellows
28 second bellows
29 second pre-stressing appliance
30 third mechanical seal
31 rotating slide ring
32 stationary slide ring
33 sealing gap
34 third sealing space
35 third piston arrangement
36 third piston element
37 first bellows
38 second bellows
39 third pre-stressing appliance
40 fourth mechanical seal
41 rotating slide ring
42 stationary slide ring
43 sealing gap
44 fourth sealing space
45 fourth piston arrangement
46 fourth piston element
47 first bellows
48 second bellows
49 fourth pre-stressing appliance
60 channels
61 slide ring support component
80 well bore
90 medium to be conveyed
160 first piston interior space
260 second piston interior space
360 third piston interior space
460 fourth piston interior space
F1 first preload force
F2 second preload force
F3 third preload force
F4 fourth preload force
P0 ambient pressure
P1 first pressure
P2 second pressure
P3 third pressure
P4 fourth pressure
X-X axial direction

The invention claimed is:

1. A mechanical seal arrangement, comprising:
   a first mechanical seal with a rotating slide ring and a stationary slide ring, which define a sealing gap in between them;
   a first sealing space that is filled with a sealing liquid, wherein the first mechanical seal seals off the sealing space against a surrounding area;
   a first piston arrangement with a piston element and flexible wall areas that define a first piston interior space, wherein the first piston interior space is in fluid connection with the first sealing space, and wherein a piston outer surface of the piston element is in fluid connection with the surrounding area;
   a first pre-stressing appliance that exerts a first preload force (F1) on the piston element of the first piston arrangement; and a second mechanical seal with a rotating slide ring and a stationary slide ring, which define a sealing gap in between them, a second sealing space and a second piston arrangement with a piston element and flexible wall areas, which define a second piston interior space, wherein the second mechanical seal is arranged between the first sealing space and the second sealing space, and the second piston interior space is in fluid connection with the second sealing space, and a second pre-stressing appliance exerts a second preload force (F2) on the second piston arrangement, wherein the first piston interior space is an annular space and the piston element of the first piston arrangement is an annular piston, wherein the flexible area walls abut respective surface portions of the piston element, wherein the surface portions face a direction the same as a force direction of the first preload force.

2. A mechanical seal arrangement according to claim 1, wherein the flexible wall areas comprise a first bellows and a second bellows.

3. A mechanical seal arrangement according to claim 1, wherein the first pre-stressing appliance comprises a plurality of spring elements.

4. A mechanical seal arrangement according to claim 1, further comprising a third mechanical seal with a rotating slide ring and a stationary slide ring, which defines a sealing gap in between them, a third sealing space and a third piston arrangement with a piston element and flexible wall areas, which define a third piston interior space, wherein the third mechanical seal is arranged between the second sealing space and the third sealing space and the third piston interior space is in fluid connection with the third sealing space, and a third pre-stressing appliance, which exerts a third preload force (F3) on the third piston arrangement.

5. A mechanical seal arrangement according to claim 4, further comprising a fourth mechanical seal with a rotating slide ring and a stationary slide ring, which define a sealing gap in between them, a fourth sealing space and a fourth piston arrangement with a piston element and flexible wall areas, which define a fourth piston interior space, wherein the fourth mechanical seal is arranged between the third sealing space and the fourth sealing space and the fourth piston interior space is in fluid connection with the fourth sealing space, and a fourth pre-stressing appliance exerts a fourth preload force (F4) on the fourth piston arrangement.

6. A mechanical seal arrangement according to claim 1, further comprising a housing sleeve with at least one opening that encloses the surrounding area, wherein the opening provides a connection to an outer side of the housing sleeve.

7. A well bore conveyor device for conveying oleiferous media, comprising:
   an electrical drive;
   a pump that is connected to the electrical drive via a drive shaft; and
   a mechanical seal arrangement according to claim 1 arranged at the drive shaft.

8. A well bore conveyor device according to claim 7, comprising a housing sleeve with at least one opening, wherein the housing sleeve encloses the mechanical seal arrangement.

* * * * *